(12) United States Patent  (10) Patent No.: US 9,344,358 B2
Bhardwaj et al.  (45) Date of Patent: May 17, 2016

(54) AGING-AWARE ROUTING FOR NOCS

(71) Applicant: Utah State University, North Logan, UT (US)

(72) Inventors: Kshitij Bhardwaj, New York, NY (US); Koushik Chakraborty, Logan, UT (US); Sanghamitra Roy, Logan, UT (US)

(73) Assignee: Utah State University, North Logan, UT (US)

( * ) Notice: Subject to any disclaimer, the term of this patent is extended or adjusted under 35 U.S.C. 154(b) by 420 days.

(21) Appl. No.: 13/793,904

(22) Filed: Mar. 11, 2013

(65) Prior Publication Data

US 2013/0235877 A1 Sep. 12, 2013

Related U.S. Application Data

(60) Provisional application No. 61/609,781, filed on Mar. 12, 2012, provisional application No. 61/653,291, filed on May 30, 2012.

(51) Int. Cl.
*H04L 12/721* (2013.01)
*H04L 12/933* (2013.01)
*H04L 12/755* (2013.01)
*G06F 11/20* (2006.01)
*H04W 40/24* (2009.01)

(52) U.S. Cl.
CPC ............ *H04L 45/38* (2013.01); *G06F 11/2028* (2013.01); *H04L 45/021* (2013.01); *H04L 49/109* (2013.01); *H04W 40/242* (2013.01)

(58) Field of Classification Search
CPC ...... H04L 45/021; H04L 45/38; H04L 49/109
See application file for complete search history.

(56) References Cited

U.S. PATENT DOCUMENTS

| | | | |
|---|---|---|---|
| 7,352,641 B1* | 4/2008 | Wu | 365/211 |
| 2011/0072239 A1* | 3/2011 | Burger et al. | 712/29 |
| 2012/0079147 A1* | 3/2012 | Ishii et al. | 710/107 |
| 2013/0047023 A1* | 2/2013 | Penzes | H03K 3/0315 713/502 |
| 2013/0080090 A1* | 3/2013 | Potkonjak | 702/58 |

OTHER PUBLICATIONS

"Computing IC Temperature Rise", Machine Design Issue of 1977, Penton/IPC Inc.*
Kshitij Bhardway et al., Towards Graceful Aging Degradation in NoCs Through an Adaptive Routing Algorithm, Design Automation Conference, Jun. 3-7, 2012, pp. 382-391, San Francisco, CA.
Kshitij Bhardway, Aging-Aware Routing Algorithms for Network-on-Chips, All Graduate Theses and Dissertations, Aug. 1, 2012, Paper 1319, Logan, UT.
Kshitij Bhardway et al., An MILP-Based Aging-Aware Routing Algorithm for NoCs, Design, Automation & Test in Europe Conference & Exhibition, Mar. 12-16, 2012, Dresden, Germany.

* cited by examiner

*Primary Examiner* — Omer S Mian

(57) ABSTRACT

For aging-aware routing, an aging module calculates an aging score for links and routers in a Network-on-Chip for a previous epoch. A routing module dynamically routes a flow through the links and the routers to satisfy routing criteria including a least total aging score for the links and the routers of the flow.

18 Claims, 8 Drawing Sheets

AGING-AWARE ROUTING FOR NOCS

CROSS-REFERENCE TO RELATED APPLICATIONS

This application is a continuation of and claims priority to U.S. Provisional Patent Application Ser. No. 61/609,781 entitled "AGING-AWARE ROUTING METHOD FOR NoCs" filed on Mar. 12, 2012 for Kshitij Bhardwaj et al. which is incorporated herein by reference and is a continuation of and claims priority to U.S. Provisional Patent Application Ser. No. 61/653,291 entitled "AGE AWARE ROUTING" filed on May 30, 2013 for Kshitij Bhardwaj et al. which is also incorporated herein by reference.

GOVERNMENT SPONSORED RESEARCH

This invention was made with government support under contract CNS-1117425 awarded by the National Science Foundation. The government has certain rights in the invention.

TECHNICAL FIELD

The present disclosure relates to an improved method for routing data packets in a Network-on-Chip (NoC) architecture, and in particular, an aging-aware routing method and apparatus for NoC.

BACKGROUND

NoC architectures have emerged as a scalable and reliable alternative to the traditional bus-based communication paradigms. However, with continuous scaling of semiconductor technologies, reliability has become a primary concern in NoC designs. Aging mechanisms such as Negative Bias Temperature Instability (NBTI) and Electromigration play a major role in limiting NoC lifetime.

SUMMARY

A method is disclosed for aging-aware routing. An aging module calculates an aging score for links and routers in a NoC for a previous epoch. A routing module dynamically routes a flow through the links and the routers to satisfy routing criteria including a least total aging score for the links and the routers of the flow.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
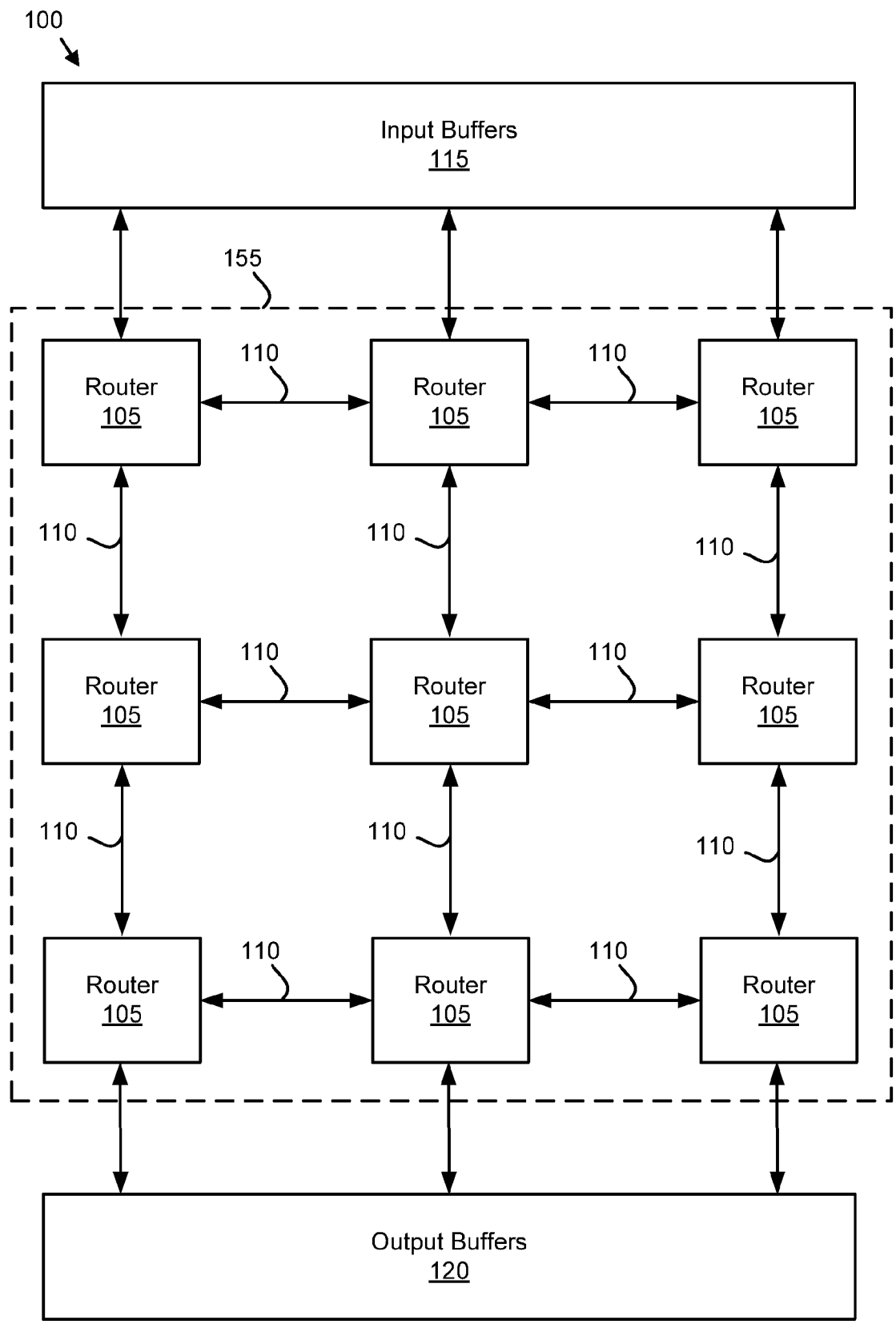
FIG. 1 is a schematic block diagram illustrating one embodiment of an NoC.

The embodiments described herein describe an aging-aware routing method and apparatus. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

FIG. 1 is a schematic block diagram illustrating one embodiment of an NoC 100. In the depicted embodiment, the NoC 100 includes one or more routers 105, one or more links 110, input buffers 115, and output buffers 120. The routers 105, links 110, input buffers 115, and output buffers 120 may be fabricated of semiconductor gates, semiconductor signal lines, and the like. The NoC 100 may perform programmable functions on data that is received of the input buffers 115. The data may be routed over one or more links 110 and through one or more routers 105 as part of performing the programmable functions. In embodiment, processing cores (not shown) in communication with the routers 105 perform the computational functions.

The embodiments described herein routes flows through the routers 105 and the links 110. Therefore although the flows carry signals to and from the processing cores, for simplicity the processing cores are not shown. The routing through the links 110 and the routers 105 may be dynamic, with changes made to the routing over the life of the NoC 100 in response to operational changes, and/or as part of functional changes.

A router 105 that is in communication with a link 110 as indicated by a line is a connected router 105. A link 110 that is communication with a router as indicated by a line is a connected link 110.

As the links 110 and the routers 105 are used, the semiconductor structures making up the links 110 and routers 105 degrade. As a result, the links 110 and the routers 105 that are more heavily used are susceptible to earlier failure, reducing the potential life of the NoC 100. The embodiments described herein perform aging aware routing through the NoC 100 to distribute and minimize the effects of aging due to use on the links 110 and routers 105 of the NoC 100. As a result, the life of the NoC 100 is increased by reducing the probability of failure for the links 110 and the routers 105.

The router 105 includes of both combinational logic structures (e.g. virtual channel allocation logic) and storage-cell structures (e.g. virtual channels). Due to the presence of these structures, NBTI is the major aging mechanism associated with the routers 105. The links 110 are implemented using repeated copper interconnects. Therefore, NBTI effects in repeaters and electromigration in copper interconnects are the two primary aging effects associated with NoC links 110.

Aging effects, including but not limited to NBTI in routers 105 and electromigration in links 110, affects the robustness of the NoC 100. A prophetic experiment using a simple NoC architecture that comprises two routers 105 connected by a link 110 illustrates aging effects. We analyze the network latency under four different degradation modeling schemes with various utilizations:

TABLE I

Different Degradation Model Schemes

| Scheme | Degradation Model for Routers | Degradation Model for Links |
| --- | --- | --- |
| A | NBTI | NONE |
| B | NBTI | NBTI |
| C | NBTI | Electromigration |
| D | NBTI | NBTI and Electromigration |

Figure 2A:
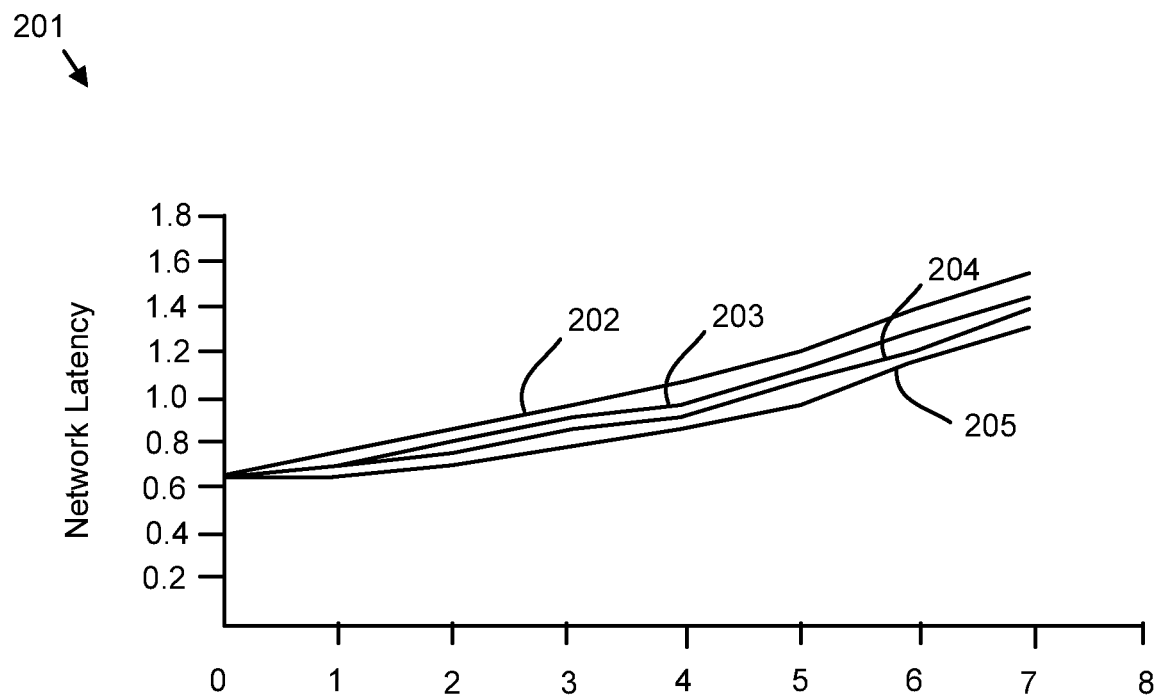
FIGS. 2A-C are graphs illustrating increases in network latency with time.

FIG. 2A is a graph 201 showing the variation of network latency with time for the four degradation schemes shown in Table I. In FIG. 2A, the injection rate is 0.1 flits/cycle where a flit is a flow control unit, the smallest unit that is transmitted over an NoC link 110 in a pipelined fashion. Scheme D 202 estimates the highest network latency. Because both NBTI and electromigration are degrading the link 110 more, there is a larger increase in latency. Scheme B 204 shows lower latency than scheme A as only NBTI is considered for links 110. Scheme C 203 has still lower latency as only electromigration without NBTI is considered for links 110. Network latency is least affected in scheme A 205 as degradation is only due to NBTI degradation in the routers 105.

Figure 2B:
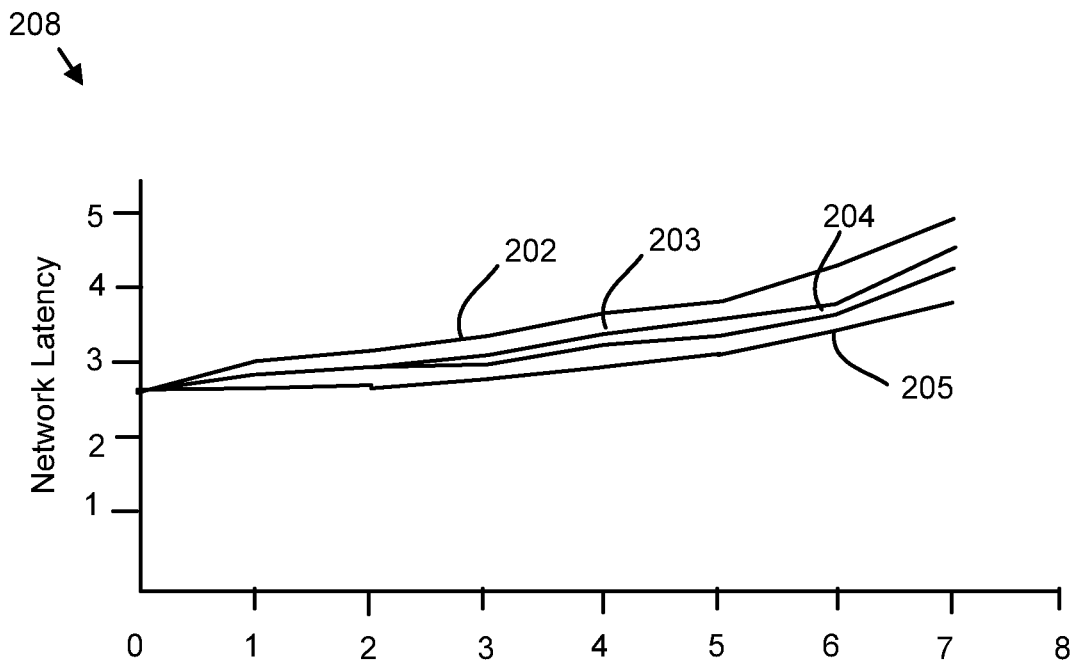
Figure 2C:
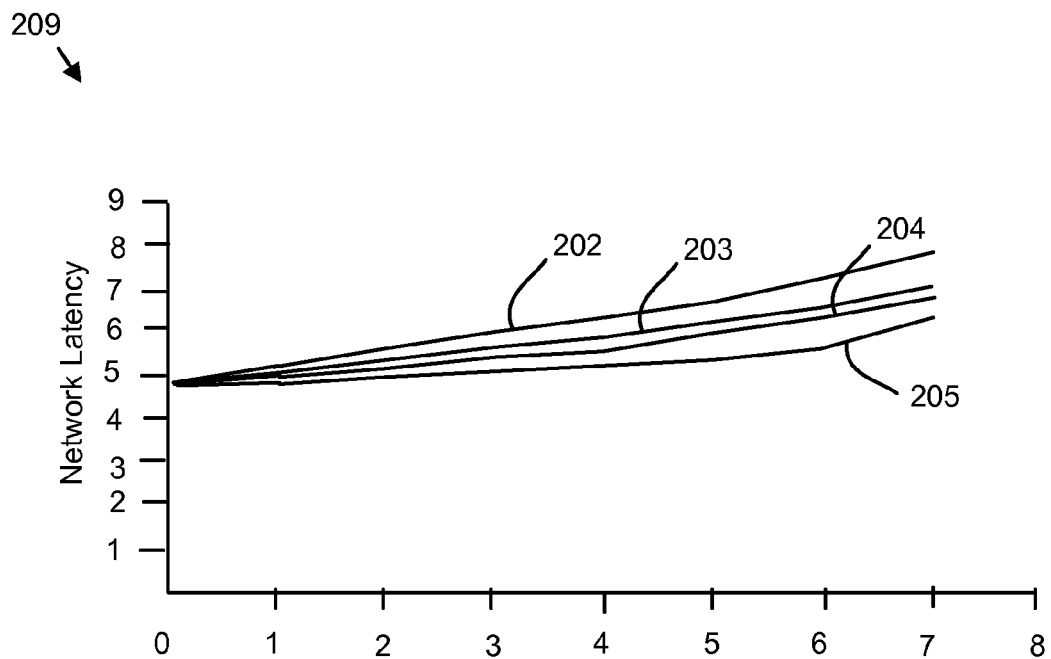

FIG. 2B is a graph 208 showing the variation of network latency with time for four degradation schemes of FIG. 2A with an injection rate of 0.3 flits/cycle. FIG. 2C is a graph 209 showing the variation of network latency with time for four degradation schemes of FIGS. 2A-B with an injection rate of 0.5 flits/cycle.

Effect on Fault-Tolerance of NoC

Figure 3:
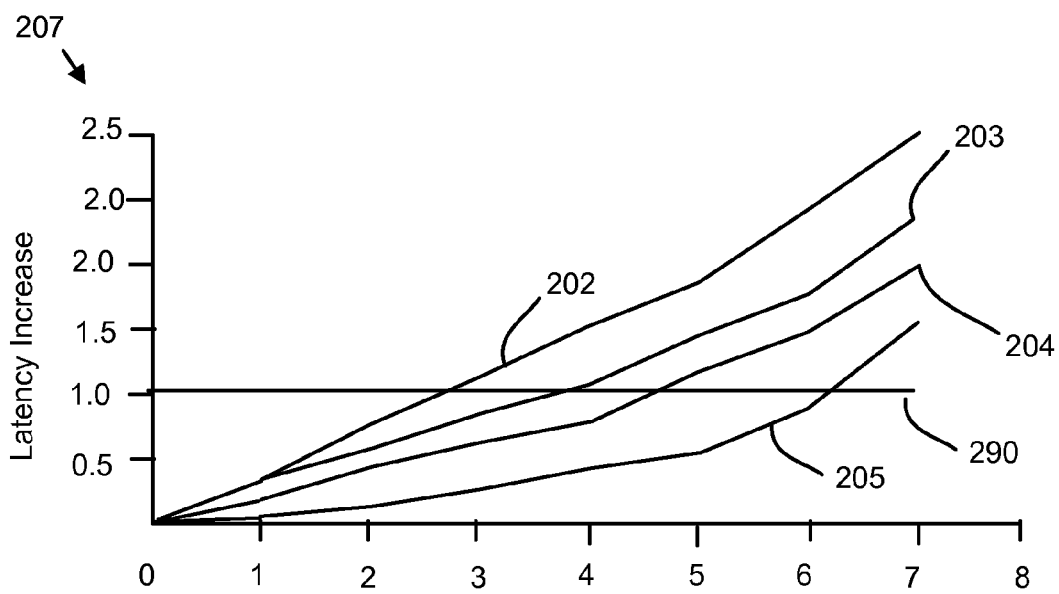
FIG. 3 is a graph illustrating time for an NoC to become faulty.

Due to the continuous degradation in network latency, the NoC 100 will be rendered faulty after a point in time. We assume that a NoC 100 becomes faulty when the network latency exceeds a pre-defined fault threshold. In one embodiment, the pre-defined fault threshold is 40%. FIG. 3 is a graph 207 showing the time taken for the NoC 100 to become faulty under different scenarios relative to a threshold 290. For example, under scheme D 202, the NoC 100 can be rendered faulty in 3 years. However, using scheme A 205 grossly over-estimates the time to failure at more than eight years. Schemes B 204 and C 203 show intermediate degradation.

System-Level Aging Mode for NoC

Figure 4:
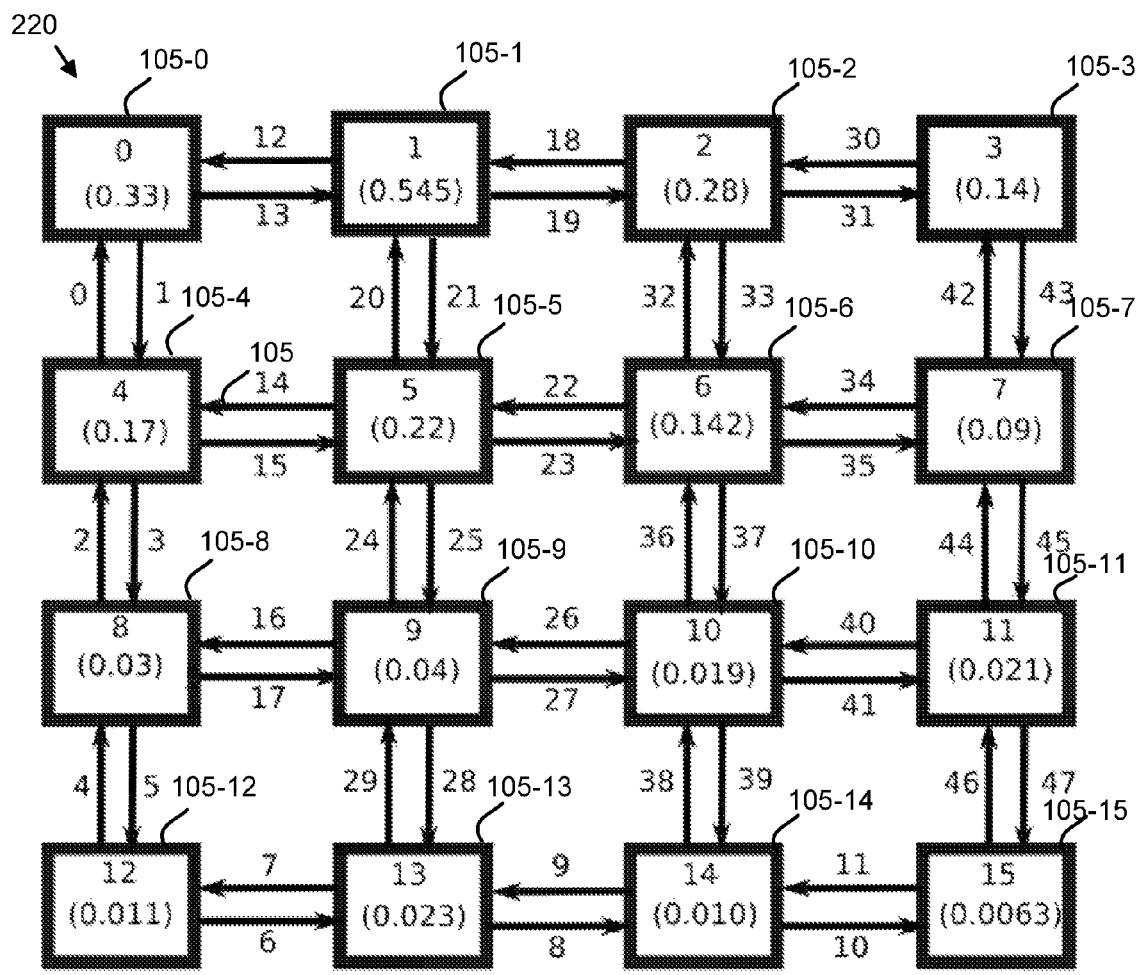
FIG. 4 is a schematic block diagram illustrating router/link utilization in an NoC.

FIG. 4 is a schematic block diagram illustrating router/link utilization in an NoC 100. In the NoC 100, every router 105 and link 110 are utilized in different amounts, some more than others. This router/link utilization depends on the amount of communication between different processing cores. For example, FIG. 4 shows the variation in buffer utilization (flits/cycle) in a 4×4 router 105 NoC mesh 220 with links 110 represented as arrows. This utilization was obtained using the GARNET NoC simulator with traffic generated by the canneal benchmark.

A system-level model is derived to find the relationship between router/link utilization and the amount of stress or aging experienced during NBTI/electromigration degradation. For this purpose, a novel metric called traffic threshold per epoch (TTpE) is introduced. TTpE is defined as the fraction of the nominal traffic that a stressed router 105/link 110 should accept. Nominal traffic is the traffic across routers 105/links 110 when they are unstressed.

Based on this model, a heavily utilized router 105/link 110 that experiences maximum stress should accept the least traffic, i.e. the TTpE value of the router 105/link 110 must be low. In one embodiment, TTpE imposes an effective limit on the amount of traffic that a stressed router 105/link 110 can accept. If this limit is exceeded in a router 105 undergoing maximum degradation, the NoC 100 is more likely to be rendered faulty. The embodiments describe using an aging score that may be the TTpE to route flows with the NoC 100.

Modeling Effects of NBTI on NoC Routers

Due to the presence of both combinational and storage circuitry in NoC routers 105, the effects of NBTI on the performance of these routers 105 should not be ignored. In this section, we model these effects using a long-term NBTI model shown in equation 1.

$$\Delta V_{th} \approx \left( \frac{n^2 K_v^2 \alpha C t_1 t}{\xi^2 t_{ox}^2 (1-\alpha)} \right)^n \quad (1)$$

In equation 1, $\Delta V_{th}$ denotes the threshold voltage change in a PMOS. $K_V$ denotes $$\left( \frac{q t_{ox}}{\epsilon_{ox}} \right)^3 K^2 C_{ox} (V_{gs} - V_{th}) \sqrt{C} \exp\left( \frac{2 E_{ox}}{E_o} \right);$$

$C_{ox}$ is the oxide capacitance per unit area; q is the electron charge; t is the aging period (in seconds); $T_{clk}$: 0.33 ns; C is $$T_0^{-1} \cdot \exp\left( -\frac{E_a}{kT} \right);$$

$E_a$(eV) is 0.49; T is Temperature; n is 0.166; α is duty cycle; $t_1$ is $10^{-4}$; ξ: 0.95; $t_{ox}$ is 1.75E-9; and $E_o$(V/nm) is 0.335.

To find the TTpE of a stressed router 105, certain embodiments use a similar analysis as disclosed by Sun, J. et al., *NBTI aware workload balancing in multi-core systems*, PROC. OF ISQED, 833-838 (2009) (Sun), which is hereby incorporated by reference in its entirety. In one embodiment, the workloads across the stressed cores are estimated by considering delay variations.

Analyzing Delay Variation in a Stressed Router

In an NoC 100, different routers 105 can experience a wide variation in performance degradation due to the combined effect of process variation and NBTI aging. Fundamentally, in some embodiments, the TTpE of a stressed router 105 is estimated by comparing its performance degradation, measured as the delay variation, with that of the router 105 experiencing the maximum performance degradation.

In one embodiment, the TTpE for a router 105 is calculated from $\Delta V_{th}$, the threshold voltage change for a PMOS gate, as shown in equation 2, where q is the elementary charge, $N_{it}(t)$ is a number of interface traps per unit area at time t, and $C_{ox}$ is the PMOS gate capacitance.

$$\Delta V_{th} = \frac{qN_{it}(t)}{C_{ox}} \quad (2)$$

To estimate the delay variation in a stressed router 105, a gate delay model is extended to a critical path delay model. After perturbing $V_{th}$ as $V_{th}=V_{th0}+\Delta V_{th}$, the i-th critical path delay can calculated using equation 3, where delay $delay_i(V_{th0}, L_{eff})$ is modeled as a Gaussian distribution with $V_{th0}$ and $L_{eff}$ as the nominal threshold voltage and channel length.

$$delay_r = delay_r(V_{th0}, L_{eff}) + \left(\frac{\delta delay_i}{\delta V_{th}}\right)\Delta V_{th} \quad (3)$$

As there can be many critical paths in a single router 105, the critical path with the biggest variation may be used in the calculation of TTpE. In a preferred embodiment, we analyze all the routers 105 in the system and estimate their biggest critical path variation. The TTpE of a given router 105 may then be estimated by comparing its delay variation with that of the router 105 with the worst variation. However, in case the worst router experiences more than three standard deviations variation, which statistically covers 99.7% of all delay variations in the NoC 100, we may simply use the three standard deviation delay $3\sigma_{delay}$ variation for TTpE estimation, as shown in equation 4.

$$\Delta delay_r = \min(\max_i((\delta delay_i/V_{th})\Delta V_{th}), 3\sigma_{delay}) \quad (4)$$

To relate the delay variation with TTpE, a NBTI aware workload balancing percentage model is used. In this exemplary model, when the delay has zero variation, the value of TTpE is 100% and when the delay variation is maximum (at $3\sigma_{delay}$), the router should not accept any traffic (TTpE=0). Hence, TTpE may be calculated as shown in equation 5, where $TTpE_r$ is the TTpE of the stressed router 105 due to delay variation.

$$TTpE_r = 1 - \left(\frac{\Delta delay_r}{3\sigma delay_r}\right) \quad (5)$$

Modeling NBTI and Electromigration in NoC Links

NoC links 110 are modeled as repeated copper interconnects and therefore suffer from two different types of stress: a) NBTI stress that increases the repeater resistance and b) electromigration stress due to the use of barrier layers in copper interconnects that increases the wire resistance.

Analyzing Delay Variation in Stressed Links

To model the propagation delay of a repeated interconnect in the presence of NBTI and electromigration stress, one embodiment includes the increase in wire resistance due to electromigration in the NBTI-aware delay model as disclosed by Datta, B. and Burleson, W., *Analysis and mitigation of NBTI-impact on PVT variability in repeated global interconnect performance*, PROC. OF GLSVLSI, 341-346 (2010) (hereinafter "Datta"), which is hereby incorporated by reference in its entirety. Therefore, the propagation delay of the link under both NBTI and electromigration may be calculated using equation 6.

$$delay_{link_{stress}} = kT_d + p(0.69)\left(C_d + \frac{C_w}{k} + C_g\right)\Delta R_o + \\ p(0.69)\left(\frac{C_g}{k}\right)\Delta R_w + p(0.38)\left(\frac{C_w}{k^2}\right)\Delta R_w \quad (6)$$

In one embodiment, k is the number of repeaters, $R_o$ is the repeater resistance, $C_d$ is the output drain diffusion capacitance of the repeater, $C_g$ is the input gate capacitance of repeater, $R_w$ is the wire resistance, $C_w$ is the wire capacitance, p is the number of stressed repeaters, $T_d$ is the original unstressed delay, $\Delta R_0$ is the increase in repeater resistance due to NBTI and $R_w$ is the increase in wire resistance due to electromigration.

The variability of repeater resistance with the threshold voltage ($\Delta V_{th}$) due to NBTI is given by Datta as shown in equation 7.

$$\frac{\delta R_0}{\delta V_{th}} = g\left[\frac{2 + (V_{GS} - |V_{th}| - \Delta V_{th})\left(\frac{\mu}{2v_{sat}} + \theta\right)}{1/2\mu C_{ox}\frac{W}{L}(V_{GS} - |V_{th}| - \Delta V_{th})^3}\right] \quad (7)$$

Where g is calculated using equation 8, where $\Delta V_{th}$ is given by Equation 1.

$$g = \frac{3}{4}V_{dd}\left(1 - \frac{7}{9}\lambda V_{dd}\right) \quad (8)$$

The variability of the wire resistance due to electromigration stress is modeled as disclosed by Sun, M. et al., *Lifetime RC time delay of on-chip copper interconnect*, IEEE TRAN. ON SEMICONDUCTOR MANUFACTURING, vol. 15, 253-259 (2002) (Sun2), which is hereby incorporated by reference in its entirety as shown in equation 9, where t is the stressed duration, $T_a$ is the absolute temperature of wire, $D_0$ is frequency factor in copper oxide (6.5E-7 m²/s), R is the gas constant (8.31 J/mole K)), $A_0$ is the initial height of bare copper wire (400E-9 m)) and $Q_a$ is the activation energy in copper oxide (1.64E5 J/mole).

$$\Delta R_w = \frac{2R_w\frac{\gamma'}{A_0}D_0^{\frac{1}{2}}t^{\frac{1}{2}}e^{\frac{-Q_a}{2RT_a}}}{1 - 2\frac{\gamma'}{A_0}D_0^{\frac{1}{2}}t^{\frac{1}{2}}e^{\frac{-Q_a}{2RT_a}}} \quad (9)$$

We find the effective delay variation by comparing the delay variation with its $3\sigma_{delay_{link}}$ value as calculated using equation 10.

$$\Delta delay_l = \min(delay_{link_{stress}} - T_d, 3\sigma_{delay_{link}}) \quad (10)$$

After calculation of the effective delay variation, we use the percentage model of equation 11 to evaluate the $TTpE_l$ for the stressed link 110.

$$TTpE_l = 1 - \left(\frac{\Delta d_l}{3\sigma\text{delayl}}\right) \quad (11)$$

Next, a system-level model is used to determine the effect of aging on the delay experienced by a flit due to stressed routers 105 and stressed links 110.

Effect of Aging on Flit Delay

The performance of a NoC 100 is directly related to the delay in the NoC 100. Therefore, we now model the effects of asymmetric aging in routers 105 and links 110 on the delay experienced by the flits. This modeling is used in aging-aware routing embodiments that will be described hereafter.

Total Delay Calculation due to NoC Routers and Links

The delay seen by a flit, from the time when it is buffered into the input buffers of an NoC router 105 until it is allocated an output link can be described as the delay due to an unstressed NoC router 105 or $dr_{us}$. Similarly we define the unstressed delay due to a NoC link 110 as the time taken by a flit to travel the link 110 to reach the router 105 at the other end or $dl_{us}$. If a router 105/link 110 is under aging stress, the same flit will experience a higher delay as signified by Equations 3 and 6. Therefore, the delay due to a stressed router 105 and link 110 can be formulated as shown in equations 12 and 13, where $\Delta d_r$ is given by $\Delta delay_r$ in Equation 3 and $\Delta d_l$ is given by $\Delta delay_l$ in Equation 10. $\Delta d_r$ and $\Delta d_l$ for different routers and links will be different based on their utilization.

$$dr_s = dr_{us} + \Delta d_r \quad (12)$$

$$dl_s = dl_{us} + \Delta d_l \quad (13)$$

Experimental Methodology

Delays may be modeled with a SPICE level analysis for process variation and NBTI aging, statistical timing analysis using synthesized Verilog for NoC routers 105, and full system architectural simulation. The effect of process variation and NBTI aging in basic logic gates are performed through Synopsys HSPICE, using Predictive Technology Models (PTM), and long term degradation due to NBTI in equation 7. On each of these gates, we run 10K Monte Carlo simulations to obtain respective statistical distribution of their performance characteristics. Using these gates at 45 nm technology, we synthesize the NoC router 105 RTL obtained from Stanford University's open-source NoC router resources. Subsequently, we perform a statistical timing analysis to find various critical paths in the router, and their delay distributions under the combined effect of process variation and NBTI aging.

For architectural simulation, we use the GARNET NoC simulator, embedded inside GEMS as disclosed by Martin, M. M. K., et al., *Multifacets general execution-driven multiprocessor simulator (gems) toolset*, SIGARCH COMPUT. ARCHIT. NEWS 33 (2005), which is hereby incorporated by reference in its entirety. GARNET uses the ORION power model to calculate power consumptions of the routers and the links. In an embodiment of the present disclosure, we consider a NoC 220 with 16 processors in a 4×4 mesh topology. Each processor has a dual issue 32 entry out-of-order issue window and a private L1 cache (2-way, 32 KB, response latency: 3 cycles) and a shared L2 cache (4-way, 2 MB, response latency: 15 cycles). For traffic generation purposes, we use PARSEC benchmarks with 16 threads pinned to cores. Workloads: For traffic generation purposes, we use PARSEC benchmarks with 16 threads pinned to cores. The following examples are illustrative only and are not intended to limit the embodiments in any way.

TTpE: A Case Study

In this section, we present a prophetic example to show that the stressed NoC routers 105 and links 110 have different TTpE values depending on their utilization.

Estimating TTpE

In order to calculate different TTpE values, we first gather router 105 and link 110 utilization by running different benchmarks on the GEMS-GARNET setup. Once the utilization is known, we consider the top 8 routers 105 and links 110 that have the highest utilization. As these selected routers 105 and links 110 are most heavily utilized, they have higher power consumptions and temperatures and therefore will be more affected by aging as compared to others. Also, as these selected routers 105 and links 110 have different utilization among themselves, they will be under differential stress and will consequently have different TTpE values. These TTpE values are calculated using the proposed system-level aging model.

In one embodiment, we ran four PARSEC benchmarks to generate traffic in the GARNET simulator. Tables II and III show the different $TTpE_r$ and $TTpE_l$ for different benchmark traffic. As is evident from both the tables, TTpE values for one stressed router/link differs from the other. For example, In Table II, when traffic is generated by Canneal benchmark run, router R7 (least utilized among stressed routers) has the maximum $TTpE_r$ and R1 (most utilized among stressed routers) has the minimum among the 8 stressed routers. $TTpE_r$ for other stressed routers lie between these two extreme cases which are separated by the range, calculated as the percentage of average TTpE values.

TABLE II $TTpE_r$ for different benchmarks (%)

| Benchmark | Max $TTpE_r$ | Min $TTpE_r$ | Avg. $TTpE_r$ | Range |
|---|---|---|---|---|
| Canneal | 82.3 | 68.5 | 73.4 | 18.80 |
| Dedup | 73.13 | 43.75 | 53.6 | 54.81 |
| Facesim | 63.5 | 29.24 | 39.67 | 86.36 |
| Ferret | 65.06 | 31.35 | 40.24 | 83.77 |

TABLE III $TTpE_l$ for different benchmarks (%)

| Benchmark | Max $TTpE_l$ | Min $TTpE_l$ | Avg. $TTpE_l$ | Range |
|---|---|---|---|---|
| Canneal | 85.22 | 69.9 | 78.4 | 19.54 |
| Dedup | 80.60 | 49.98 | 65.44 | 46.79 |
| Facesim | 81.28 | 59.79 | 69.10 | 31.09 |
| Ferret | 81.95 | 51.22 | 66.50 | 46.21 |

This experiment provides the following observations: (1) Each stressed router 105/link 110 has different TTpE values; and (2) a stressed router 105/link 110 which is utilized heavily should accept less traffic as compared to some other less utilized router 105/link 110. Therefore, TTpE values can be used as a measure of amount of stress or aging on routers 105 and links 110.

Aging-Aware Routing

The embodiments may mitigate aging effects on NoC-based multicore system performance with minimal overhead. Simply meeting TTpE limits can substantially improve NoC reliability, but comes at a high cost of other design constraints. To effectively perform a multi-objective design space exploration, we use an optimization framework to formulate an aging-aware routing.

In one embodiment, router and link utilization from the traffic profiling is used in routing. An application's communication characteristics (e.g. link and router utilization) might change at runtime. To mitigate this problem, it is possible to create several routing schemes using our optimization framework for different traffic scenarios. At runtime, the system can periodically monitor the traffic pattern and choose the routing scheme that best matches the observed network traffic characteristics.

Traffic Threshold Calculation

In order to control traffic across a stressed router, traffic flowing through the links 110 that input to the router 105 should be controlled. For example, if router 105-5 in FIG. 4 is stressed, then the traffic across the input links (L15, L21, L22, L24) should be controlled such that router 5 105-5 meets its TTpE limit.

Therefore, the input links 110 to a stressed router 105, whether stressed or unstressed, should have an upper bound on the traffic that the links 110 can accept. In the case of stressed links, this bound should be less than or equal to the TTpE limits of the links 110.

The variables used that may be used include the following:
1) Variable to indicate the flow of flits.
Fk: flow between a source and destination pair (s, d).
2) Variable to indicate the amount of flits flowing through a link due to a flow.
$FL_j^k$: Amount of flits flowing through a link j 110 due to flow $F^k$, measured in flits.
$P_j^k$: Amount of flits flowing through a link j 110 due to flow $F^k$, measured in flits/cycle (link utilization).
3) Variable to show if a link j 110 is utilized for flow $F^k$.

$$U_j^k = \begin{cases} 1 & \text{if } FL_j^k > 0 \\ 0 & \text{if } FL_j^k = 0 \end{cases} \quad (14)$$

4) Variables to indicate the set of input links 110 and the set of output links 110 for a router R 105.
I(R), O(R): Set of input and output links 110 to a router 105.
5) Variables to indicate the total number of Flits that comprise a flow $F^k$ (Capacity of flow), $C_k$ and total number of Flits across all flow, TC.
6) Variable to indicate the total number of hops for $F_k$.

$$hp^k = \sum_{j \in L_T} U_j^k - 1 \quad (15)$$

7) Variable to formulate total delay across all the links 110. One embodiment used the delay-per-flit across the stressed and unstressed routers 105.

$$TLD = \sum_{k \in T_j} \sum_{j \in L_T} FL_j^k * dl_j \quad (16)$$

where $T_f$ represents all flows in the network and $dl_j$ is the delay-per-flit of link j 110:

$$dl_j = \begin{cases} dl_{usj} & \text{if } j \in L_T - L_{stress} \\ dl_{sj} & \text{if } j \in L_{stress} \end{cases} \quad (17)$$

8) Variable to show if a router i 105 is utilized for a flow $F_k$ $$r_i^k = \begin{cases} 1 & \text{if } \sum_{j \in O(i)} U_j^k = 1 \\ 0 & \text{if } \sum_{j \in O(i)} U_j^k = 0 \end{cases} \quad (18)$$

9) Variable for delay across all the routers 105. Here also we use delay-per-Flit across the stressed and unstressed routers as in Section II-C.

$$TRD = \sum_{k \in T_j} C_k * \left( \sum_{i \in R_T} dr_i * r_i^k \right) \quad (19)$$

where $dr_i$ is the delay-per-flit of each router i:

$$dr_i = \begin{cases} dr_{us} & \text{if } i \in R_T - R_{stress} \\ dr_s & \text{if } i \in R_{stress} \end{cases} \quad (20)$$

10) Variable to indicate total delay.

$$TD = TLD + TRD \quad (21)$$

11) Link utilization for flow $F^k$ in flits per cycle:

$$P_j^k = FL_j^k / TD \quad (22)$$

12) Variable to indicate energy-per-flit for a flow $F^k$ ($E_{flit}^k$). Assuming each Flit is composed of n bits, we used the energy model as disclosed in Hu, J. and Marculescu, R., *Energy-and performance-aware mapping for regular NoC architectures*, TCAD 24, 4 551-562 (2005), which is hereby incorporated by reference in its entirety, to model ($E_{flit}^k$):

$$E_{flit}^k = n * hp^k * E_{sbit} + n * (hp^p - 1) * E_{lbit} \quad (23)$$

where $E_{sbit}$ and $E_{lbit}$ are the energy consumed by the router switch and energy consumed by the links when 1 bit of data is transported through the router. Therefore, the total energy consumed due to all the flows is:

$$TE = TC \sum_{k \in T_j} E_{flit}^k \quad (24)$$

13) Variable to indicate EDPPF, defined as the product of total energy and total delay-per-flit.

$$EDPPF = (TE * TD) / TC \quad (25)$$

14) In order to avoid deadlock or live-lock, we use a turn prohibition model as taught by Glass, C. j. and Ni, L. M., *The Turn Model for Adaptive Routing*, 25 YEARS ISCA: RETROSPECTIVES AND REPRINTS 441-450 (1998), which is hereby incorporated by reference in its entirety. In a two-dimension NoC topology, a flit can follow eight different turns. According to the directions of the input and output links, turns can be categorized as: west-north (WN), north-east (NE), eastsouth (ES), south-west (SW) in the clockwise direction and west-south (WS), south-east (SE), east-north (EN), north-west (NW) in the counter-clockwise direction.

Constraints

We now discuss the different constraints:

1) Every link that is utilized for a flow $F^k$ should operate under its threshold value (Tj). This threshold may be calculated using the TAC values as described in Section V-A.

$$\sum_{k \in T_j} P_j^k \leq T_j \ \forall \ j \in L_T \tag{26}$$

2) The number of hop counts for a flow $F^k$ should be less than a maximum limit $H_k$.

$$hp^k \leq H_k \forall k \in T_f \tag{27}$$

3) There should be a single path between a (s, d) pair. Conservation of flow is also beneficial. Therefore $\forall k \in T_f$, for a source router $R_s$ and destination router $R_d$, $$\sum_{j \in I(R_s)} U_j^k = 0 \sum_{j \in O(R_s)} U_j^k = 1 \sum_{j \in I(R_d)} U_j^k = 1 \sum_{j \in O(R_d)} U_j^k = 0 \tag{28}$$

for an intermediate router $R_i$, $$\sum_{j \in I(R_s)} U_j^k = \sum_{j \in O(R_s)} U_j^k \tag{29}$$

4) In order to avoid deadlocks, some of the turns discussed in the previous section should be prohibited. Therefore, we also include the constraints due to the prohibition turn model described by Nikitin, N. et al, *Physical-Aware Link Allocation and Route Assignment for Chip Multiprocessing*, NOCS 125-134 (2010), hereby incorporated by reference in its entirety, in our MILP formulation.

Cost Functions

Different objective functions for the routing algorithm that should be minimized are shown in Table IV.

TABLE IV

Cost Functions to Minimize

| Description | Variables Involved |
|---|---|
| Number of links utilized by a flow | $\Sigma_{j \in L_T} U_j^k$ |
| Total number of links utilized for all flows | $\Sigma_{k \in T} \Sigma_{j \in L_T} U_j^k$ |
| Total delay due to all routers | TRD |
| Total delay due to all links | TLD |
| Total energy across all flows | TE |
| Energy-Delay-Product-Per-Flit | EDPPF |

Dynamic Routing

Figure 5:
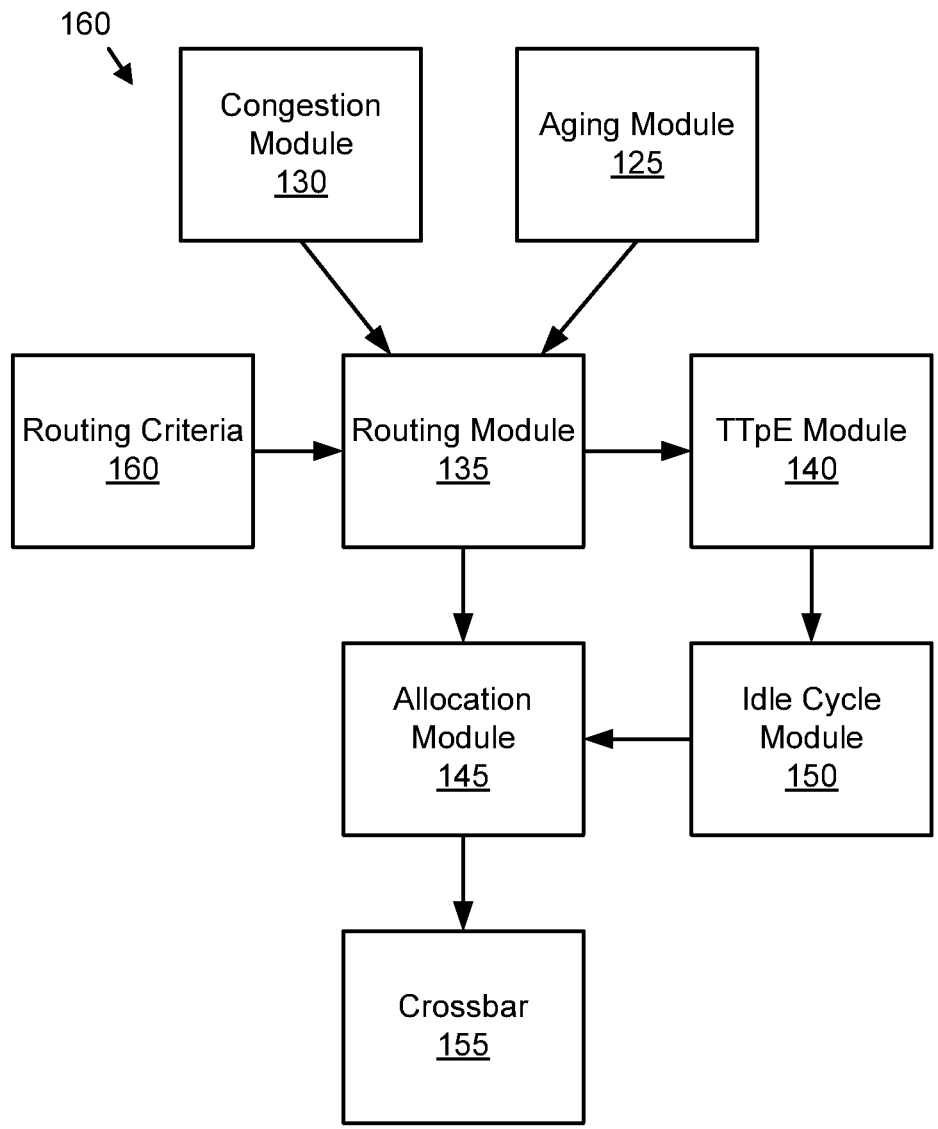
FIG. 5 is a schematic block diagram illustrating one embodiment of an aging-aware routing system.

FIG. 5 is a schematic block diagram illustrating one embodiment of an aging-aware routing system 160. The system 160 includes a congestion module 130, an aging module 125, a routing module 135, a TTpE module 140, an allocation module 145, an idle cycle module 150, a cross bar 155, and routing criteria 160. The congestion module 130, aging module 125, routing module 135, TTpE module 140, allocation module 145, idle cycle module 150, and routing criteria 160 may be implemented in semiconductor gates, firmware executing on a processor core, or combinations thereof. The crossbar 155 may be implemented in semiconductor gates.

In one embodiment, the cross bar 155 routes flows through the NoC 100. A flow may be the routing of one or more signals through the NoC 100. A flow may connect one or more processing cores, the input buffers 115, and/or the output buffers 120 through one or more routers 105 and one or more links 110. Thus the NoC 100 is routed using the crossbar 155.

The congestion module 130 may identify congested flows through the routers 105 and links 110 of the NoC 100. In one embodiment, the congestion module 130 determines a number of links 110 in each flow. As used herein, a flow is the path a signal and/or signals follows through the routers 105 and links 110. The flow may be between one or more processing cores, the input buffers 115, and the output buffers 120.

The aging module 125 calculates an aging score for the links 110 and the routers 105 in the NoC 100 for a previous epoch. The aging score for each router 105 may be the TTpE for the router 105 as calculated with equation 5. The aging score for each link 110 may be the TTpE for the link 110 as calculated with equation 11. In one embodiment, the TTpE$_r$ for the router 105 may be calculated as the sum of TTpE$_{ln}$ for each link n 110 connected to the router 105 as shown in equation 30.

$$TTpE_r = \Sigma TTpE_{ln} \tag{30}$$

The TTpE may be stored in lookup tables. The lookup tables may be data structures associated with each router 105. The lookup tables may be centralized such as at a first processing core. Alternatively, the lookup tables may be distributed to each router 105. In one embodiment, the TTpE is calculated and stored each epoch for each router 105 and each link 110. Alternatively, the TTpE is calculated and stored each epoch for routers 105 and links 110 that are most stressed.

The routing module 135 may use the congested flows identified by the congestion module 130 and the TTpE calculated by the aging module 125 to determine the flows for the NoC 100. The routing module 135 may route each flow through the links 110 and the routers 105 to satisfy the routing criteria 160. In one embodiment, the routing criteria 160 comprise a least number of links 110 in the flow. For example, the routing module 135 may iteratively route alternative flows and save the flow with the least number of links. The routing module 135 may continue this iterative routing until the number of links in the flow cannot be reduced further.

The routing criteria 160 may also comprise a least total aging score for the links 110 and the routers 105 of the flow. In one embodiment, the routing module 135 routes multiple alternative flows and saves the flow with the lowest total aging score. The routing module 135 may iteratively route the alternative flows until the flow with the lowest total aging score is identified.

The TTpE module 140 dynamically determines an aging score such as the TTpE for the routers 105 and the links 110. The TTpE module 140 may further monitor the TTpE and determine if the TTpE for a router 105 and/or a link 110 exceeds a TTpE threshold. If the TTpE exceeds the TTpE threshold, the TTpE module 140 may notify the idle cycle module 150. The idle cycle module may insert an idle cycle for a link 110 in response to the TTpE exceeding the TTpE threshold. Thus the router 105 and/or link 110 is prevented from exceeding the TTpE threshold.

The allocation module 145 may configure the crossbar 155. In one embodiment, the allocation module 145 configures the crossbar 155 in response to the routing determined by the routing module 135. In addition, the allocation module 145 may modify the configuration of the crossbar 155 in response to idle cycles from the idle cycle module 150.

Figure 6:
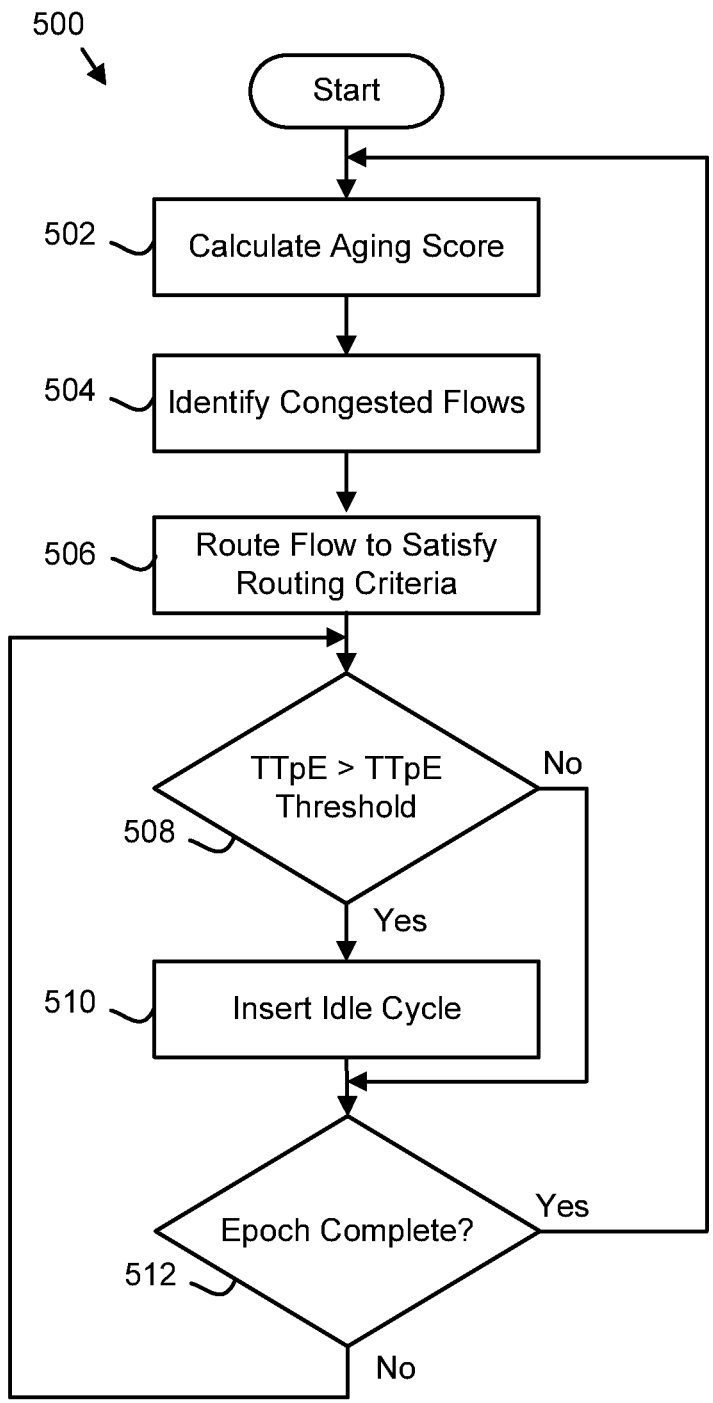
FIG. 6 is a flow chart diagram illustrating one embodiment of an aging-aware routing method.

FIG. 6 is a flow chart diagram illustrating one embodiment of an aging-aware routing method 500. The method 500 may be performed by the routing system 160 of FIG. 5. For simplicity, the method 500 is described for a single flow. One of skill in the art will recognize that the method 500 may be performed concurrently and/or serially for a plurality of flows in the NoC 100.

The method 500 starts, and in one embodiment the aging module 125 calculates 502 the aging score for a previous epoch. Alternatively, the aging module 125 may calculate 502 the aging score for all previous epochs. The aging score may be the TTpE. In one embodiment, the aging score is a cumulative TTpE for all epochs.

In one embodiment, the aging score is calculated as a function of NBTI. Alternatively, the aging score may be calculated as a function of NBTI and electromigration. In one embodiment, the aging score is calculated for each router 105. Alternatively, the aging score may be calculated for selected routers 105. For example, the aging score may be calculated for routers 105 with a cumulative aging score that exceeds a cumulative aging threshold. Alternatively, the aging score may be calculated for routers 105 with a cumulative aging score in a top cumulative percentage of all cumulative aging scores for the routers 105. In one embodiment, the top cumulative percentage is in the range of the top 5 to 20 percent of cumulative aging scores.

In one embodiment, the aging score is calculated for each link 110. Alternatively, the aging score may be calculated for selected links 110. For example, the aging score may be calculated for links 110 with a cumulative aging score that exceeds the cumulative threshold. In an alternative embodiment, the aging score may be calculated for links 110 with a cumulative aging score in the top cumulative percentage of all cumulative aging scores for the links 110.

In one embodiment, the aging score is calculated for all links 110 and all routers 105. Alternatively, the aging score may be calculated for all links 110 and selected routers 105. In a certain embodiment, the aging score is calculated for all routers 105 and selected links 110.

The congestion module 130 may identify congested flows in the NoC 100. In one embodiment, each flow comprises a header Flit corresponding to a destination router 105, a tail Flit corresponding to a source router 105, and a data Flit, corresponding to links 110 and routers 105 linking the destination router 105 and the source router 105. The congestion module 130 may identify a bandwidth utilization for all flows. Congested flows may be flows with the bandwidth utilization that exceeds a bandwidth utilization threshold.

The routing module 135 may route 506 the flow through the links 110 and the routers 105 to satisfy the routing criteria 160. The routing criteria 160 may be satisfied if one specified element of the routing criteria is satisfied. Alternatively, the routing criteria 160 may be satisfied if one or more specified elements of the routing criteria 160 are satisfied.

In one embodiment, the routing criteria 160 is satisfied it there are a least number of links 110 in the flow. The routing criteria 160 may also be satisfied if congestion is minimized for all flows. In one the routing criteria 160 may be satisfied if the bandwidth utilization for all flows is less than the bandwidth utilization threshold.

The routing criteria 160 may be satisfied if the flow comprises a least possible number of links 110. Alternatively, the routing criteria 160 may be satisfied if a minimum number of total links 110 are utilized for all flows. Alternatively, the routing criteria 160 may be satisfied if total links 110 for all flows is less than a link maximum.

In one embodiment, the routing criteria 160 may be satisfied by minimizing a delay for all routers 105. Alternatively, the routing criteria 160 may be satisfied by minimizing a delay for all links 110. In one embodiment, the routing criteria 160 may be satisfied by minimizing the delay for all routers 105 and all links 110. For example, a maximum delay for routers 105, links 110, or combinations thereof may be calculated for a first routing. The flows of the first routing may be iteratively modified to form a second routing. If the delay of the first routing is longer than the delay of the second routing, the second routing may be retained and compared against future re-routings of the flows.

The routing criteria 160 may be satisfied by minimizing energy consumption for all flows. The energy consumption may be calculated as an EDPPF. In one embodiment, the energy consumption for all flows may be calculated. In addition, the flows may be iteratively rerouted and the flow with the lower energy is retained and compared against other alternative flows.

In one embodiment, the routing criteria 160 are satisfied for a least total aging score for the links 110 and the routers 105 of the flow. In an alternate embodiment, the routing criteria 160 are satisfied for a least total aging score for the links 110 of the flow. In a certain embodiment, the routing criteria 160 are satisfied for a least total aging score for the routers 105 of the flow. Alternatively, the routing criteria 160 are satisfied if the total aging score for the links 110 and routers 105 of the flow is less than a maximum aging threshold.

In one embodiment, the routing criteria 160 are satisfied if the TTpE for each link 110 in a flow is less than the TTpE threshold. Alternatively, the routing criteria 160 are satisfied if the TTpE for each router 150 in the flow is less than the TTpE threshold. In a certain embodiment, the routing criteria 160 are satisfied if the TTpE for each router 150 and each link 110 in the flow is less than the TTpE threshold. In one embodiment, the cumulative TTpE over all previous epochs is less than the TTpE threshold to satisfy the routing criteria 160.

In one embodiment, the routing module 135 routes 506 a first flow. The routing module 135 may then route 506 a second flow and compare the first flow to the second flow. The routing module 135 may then retain the flow that best satisfies the routing criteria 160 and iteratively routes alternative flows that are compared against the retained flow. The routing module 135 may continue to route alternative flows until the flow is selected that satisfies the routing criteria 160. The allocation module 145 may implement the routing of the flow in the cross bar 155. The NoC 100 may operate using the routing of the flow.

The TTpE module 140 determines 508 if the TTpE for a router 105 and/or a link 110 in the flow exceeds the TTpE threshold. The TTpE module 140 may make the determination 508 during the operation of the NoC 100. For example, a computational condition may cause the TTpE for at least one router 105 and/or at least one link 110 to exceed the TTpE threshold during the operation of the NoC 100 in a specified epoch.

The TTpE module 140 may dynamically calculate the TTpE for the routers 105 and/or the links 110 in the flow and compare each TTpE to the TTpE threshold. If the TTpE for at least one router 105 and/or at least one link 110 exceeds the TTpE threshold, the TTpE module 140 may direct the idle cycle module 150 to insert 510 an idle cycle for a link 110 of the flow.

If the TTpE for at least one router 105 and/or at least one link 110 does not exceed the TTpE threshold, the routing module 135 may determine 512 if the current epoch is complete. If the current epoch is not complete, the TTpE module 140 may continue to determine 508 if the TTpE for a router 105 and/or link 110 in the flow exceeds the TTpE threshold. If the current epoch is complete, the aging module 125 calculates 502 the aging score.

Experimental Results

The advantages of using routing criteria that include minimizing an aging score can be illustrated by using comparing three different routing schemes including two routing schemes that consider the aging score.

Figure 7:
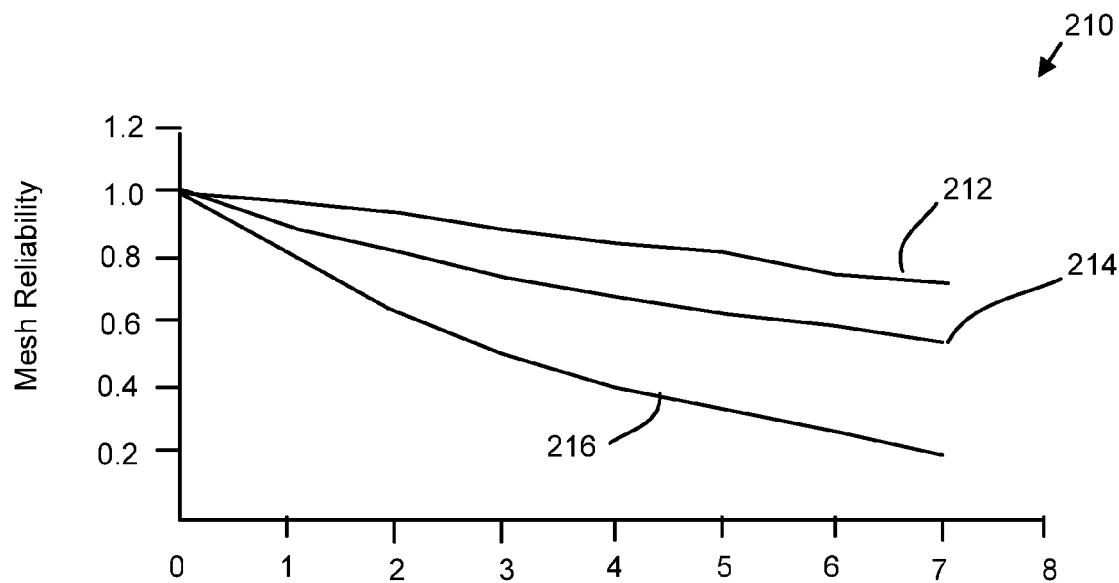
FIG. 7 is a graph illustrating the mesh reliabilities of routing schemes.

FIG. 7 is a graph 210 showing the mesh reliabilities of the three routing schemes 212, 214, 216 for aging period of 7 years. A RCA-1D routing scheme 216 employs a congestion routing criteria 160 but no aging routing criteria 160. An AGE-ADAP routing scheme 214 employs the congestion routing criteria 160 and a least total aging score routing criteria 160. An AGE-ADAP-REC routing scheme 212 employs the congestion routing criteria 160 and a least total aging score routing criteria 160, along with inserting an idle cycle in response to a first TTpE exceeding a TTpE threshold. The graph 210 uses the reliability's exponential dependence on failure rate. The AGE-ADAP-REC routing scheme 212 shows substantially higher failure rate compared to AGE-ADAP routing scheme 214.

TABLE V

Stressed Router and Link Utilization

Stressed Routers

|  | R1 | R0 | R2 | R5 | R4 | R6 | R3 | R7 |
|---|---|---|---|---|---|---|---|---|
| NO-AGE | 0.54 | 0.33 | 0.28 | 0.22 | 0.17 | 0.15 | 0.14 | 0.09 |
| TAC-LIM | 0.36 | 0.22 | 0.19 | 0.15 | 0.12 | 0.10 | 0.10 | 0.07 |
| MIP-ROUT | 0.32 | 0.20 | 0.16 | 0.14 | 0.10 | 0.09 | 0.08 | 0.03 |

Stressed Links

|  | L9 | L12 | L20 | L13 | L0 | L23 | L15 | L1 |
|---|---|---|---|---|---|---|---|---|
| NO-AGE | 0.165 | 0.126 | 0.100 | 0.098 | 0.085 | 0.080 | 0.060 | 0.056 |
| TAC-LIM | 0.111 | 0.086 | 0.069 | 0.072 | 0.065 | 0.066 | 0.050 | 0.048 |
| MIP-ROUT | 0.066 | 0.037 | 0.029 | 0.025 | 0.022 | 0.040 | 0.030 | 0.029 |

Overhead Analysis

Figure 8:
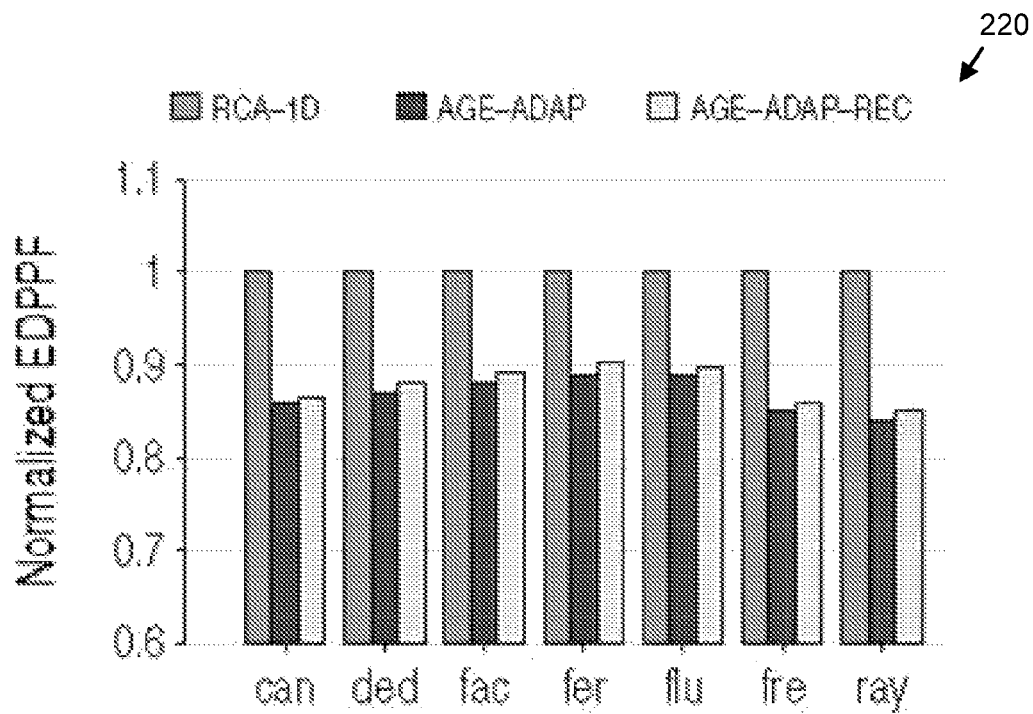
FIG. 8 is a graph illustrating an overhead estimate in network latency for routing schemes.

FIG. 8 is a graph 220 illustrating an overhead estimate in network latency for the RCA-1D, AGE-ADAP, and AGE-ADAP-REC routing schemes for the benchmark components can, ded, fac, fer, flu, fre, and ray of the canneal benchmark.

Figure 9:
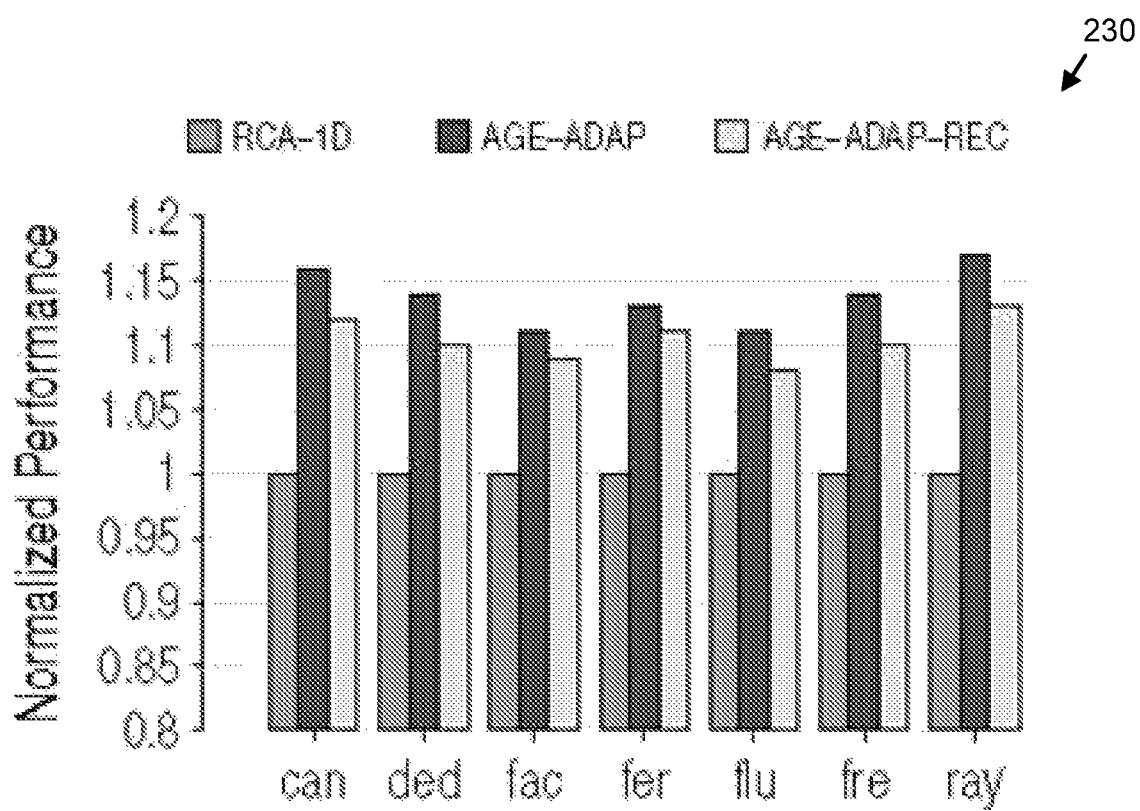
FIG. 9 is a graph illustrating the EDPPF Overhead of routing schemes.

FIG. 9 is a graph 230 illustrating the EDPPF Overhead of routing schemes for benchmarks components of the canneal benchmark for the RCA-1D, AGE-ADAP, and AGE-ADAP-REC routing schemes.

Table VI shows the loss in IPC due to TTpE-AGE and MIP-ROUT, relative to NO-AGE. Across different benchmarks, MIP-ROUT shows 41% system performance improvement over TTpE-AGE, hence showing the effectiveness of our approach.

TABLE VI

Percentage IPC Loss (Power is Better)

| Benchmark | Label | TTPE-AGE | MIP-ROUT |
|---|---|---|---|
| Canneal | can | 29.5 | 22.9 |
| Dedup | ded | 29.6 | 15.4 |
| Facesim | fac | 13.2 | 6.8 |
| Ferret | fer | 28.8 | 14.8 |
| Fluidanimate | flu | 19.5 | 8.5 |
| Freqmine | fre | 25.2 | 16.8 |
| Raystone | ray | 16.9 | 11.3 |

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
  calculating a Traffic Threshold per Epoch (TTpE) for each link or routers of a plurality of links and routers in a Network-on-Chip (NoC) for a previous epoch before a current epoch in order to determine a fraction of nominal traffic to be accepted at each link or router of the plurality of links and routers during the current epoch, wherein calculating the TTpE for each link or router comprises:
    calculating a threshold voltage change as a function of a number of interface traps per unit area and a capacitance of a metal-oxide semiconductor gate of a respective link or router;
    calculating a delay variation for the respective link or router as a function of a ratio of a largest variation of performance delays of communicated signals for all critical paths of the respective link or router and a threshold voltage for the respective link or router and further as a function of the threshold voltage change for the metal-oxide semiconductor date of the respective link or router;
    calculating the TTpE for the respective link or router as a function of a ratio of the delay variation for the link or router to a maximum delay variation for all links and routers in the NoC; and
  routing a flow through the plurality of links and the routers to satisfy routing criteria comprising a least total calculated TTpE for the plurality of links and the routers of the flow.

2. The method of claim 1, wherein the TTpE for each link or router of the plurality of links and routers is further calculated as a function of Negative Bias Temperature Instability (NBTI).

3. The method of claim 1, wherein the TTpE for each link or router of the plurality of links and routers is further calculated as a function of NBTI and electromigration.

4. The method of claim 1, wherein calculating the TTpE for each link or router of the plurality of links and routers and the routing are performed each epoch of a plurality of epochs.

5. The method of claim 1, the method further comprising inserting an idle cycle for a link in response to a first TTpE for at least one of a link and a connected router exceeding a TTpE threshold.

6. The method of claim 1, wherein calculating the TTpE for the respective link or router as a function of a ratio of the delay variation for the link or router to a maximum delay variation for all links and routers in the NoC comprises calculating the TTpE as TTpE=1−($\Delta$delay/$3\sigma$delay) where $\Delta$delay is the delay variation for the link or router and $3\sigma$delay is the maximum delay variation for all links and routers estimated as 3 standard deviations of a normal Gaussian distribution of the delay variations for all links and routers.

7. The method of claim 6, further comprising calculating the TTpE for a router of the plurality of routers by transferring the TTpE for each connected link to the router.

8. The method of claim 1, the routing criteria further comprising minimizing congestion for all flows.

9. The method of claim 1, the routing criteria further comprising minimizing a number of links utilized for all flows.

10. The method of claim 1, the routing criteria further comprising minimizing a performance delay for all routers of the flow and minimizing a performance delay for all links of the flow.

11. The method of claim 1, the routing criteria further comprising minimizing energy consumption for all flows.

12. An apparatus comprising:
    an aging module calculating a Traffic Threshold per Epoch (TTpE) for each link or router of a plurality of links and routers in a Network-on-Chip (NoC) for a previous epoch before a current epoch in order to determine a fraction of nominal traffic to be accepted at each link or router of the plurality of links and routers during the current epoch, wherein calculating the TTpE for each link or router comprises:
        calculating a threshold voltage change as a function of a number of interface traps per unit area and a capacitance of a metal-oxide semiconductor gate of a respective link or router;
        calculating a delay variation for the respective link or router as a function of a ratio of a largest variation of performance delays of communicated signals for all critical paths of the respective link or router and a threshold voltage for the link or router and further as a function of the threshold voltage change for the metal-oxide semiconductor gate of the respective link or router;
        calculating the TTpE for the respective link or router as a function of a ratio of the delay variation for the respective link or router to a maximum delay variation for all links and routers in the NoC; and
    a routing module routing a flow through the plurality of links and the routers to satisfy routing criteria comprising a least total calculated TTpE for the plurality of links and the routers of the flow.

13. The apparatus of claim 12, wherein the TTpE for each link or router of the plurality of links and routers is further calculated as a function of Negative Bias Temperature Instability (NBTI).

14. The apparatus of claim 12, wherein the TTpE for each link or router of the plurality of links and routers is further calculated as a function of NBTI and electromigration.

15. The apparatus of claim 12, wherein calculating the TTpE for each link or router of the plurality of links and routers and the routing are performed each epoch of a plurality of epochs.

16. The apparatus of claim 12, the routing module further inserting an idle cycle for a link in response to a first TTpE for at least one of a link and a connected router exceeding a TTpE threshold.

17. The apparatus of claim 16, wherein calculating the TTpE for the respective link or router as a function of a ratio of the delay variation for the link or router to a maximum delay variation for all links and routers in the NoC comprises calculating the TTpE as TTpE=1−($\Delta$delay/$3\sigma$delay) where $\Delta$delay is the delay variation for the link or router and $3\sigma$delay is the maximum delay variation for all links and routers estimated as 3 standard deviations of a normal Gaussian distribution of the delay variations for all links and routers.

18. The apparatus of claim 16, further comprising calculating the TTpE for a router of the plurality of routers by transferring the TTpE for each connected link to the router.

* * * * *